March 13, 1962   A. E. STEIN   3,024,871
WHEEL CHOCK
Filed April 23, 1958

INVENTOR.
ALBERT E. STEIN
BY
ATTORNEYS

United States Patent Office 3,024,871
Patented Mar. 13, 1962

3,024,871
WHEEL CHOCK
Albert E. Stein, 2020 Centre St., Needham, Mass.
Filed Apr. 23, 1958, Ser. No. 730,446
1 Claim. (Cl. 188—32)

This invention relates to a portable bumper or stop for automobiles for use in garages. Owing to the length of the average automobile in comparison with the interior length of the average private garage, the front end of the automobile must usually be very close to the rear wall of the garage if the automobile is far enough into the garage to permit the closing of the door. According to the present invention, a portable bumper or stop of simple construction is provided to be placed upon the floor of a garage near the rear wall thereof so as to space the front of the car from the wall, the bumper being ruggedly constructed so that the automobile can be driven up into contact with it without injuring it or the garage itself. For a more complete understanding of the invention reference may be had to the following description thereof, and to the drawing of which—

Figure 1:
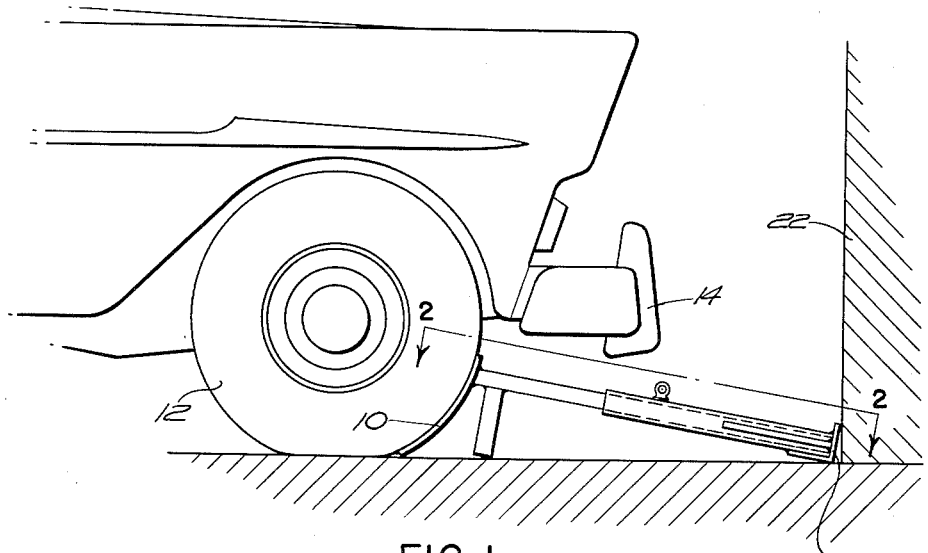
FIGURE 1 is a side elevation of a bumper embodying the invention, together with a portion of an automobile and the rear wall and floor of the garage, showing the relationship between these objects.

The bumper illustrated on the drawing comprises an elongated plate 10 which is cylindrically curved, the curvature being substantially equal to that of an automobile tire so that when the plate is horizontally supported at or near the floor, the concave face will be fitted by the curvature of the front tires 12 of an automobile. The width of the plate 10 is such that when supported as indicated in FIG. 1, the top edge thereof will be easily cleared by the automobile bumper 14 as well as any other part of the automobile forward of the tires 12. For this purpose, the arc of the transverse dimension of the plate is made to subtend an angle of about 50° as shown in FIGURE 1 of the drawing. The bumper also includes a shank 16 secured at one end to the convex face of the plate 10 midway between the ends thereof and near the upper edge thereof. The other end of the shank is secured to a cross-head 20 which may conveniently be a piece of angle-iron adapted to bear against the foot of the rear wall 22 of the garage.

Figure 3:
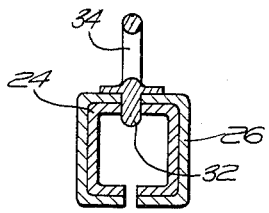
FIGURE 3 is the sectional view of the line 3—3 of FIG. 2.

The shank 16 is preferably adjustable in length. For this purpose, it is made in two telescoping parts 24 and 26. For lightness in weight and for strength, these parts are preferably tubular and, as indicated in FIG. 3, may be approximately square in cross-section. Each of the parts 24, 26 may be provided with a series of holes 30 of uniform size. The holes in the two parts are adapted to register at different positions of mutual adjustment between the two parts. When two holes thus register, a suitable locking pin 32, thrust through the registering holes, maintains the telescoping parts 24 and 26 in their respective position. To change the length of the shank 16, the pin 32 is removed by means of a convenient ring or handle 34 and the parts 24, 26 are mutually adjusted until other holes register with each other when the overall length of bumper is at the desired value. The pin 32 is then inserted into these holes.

Figure 2:
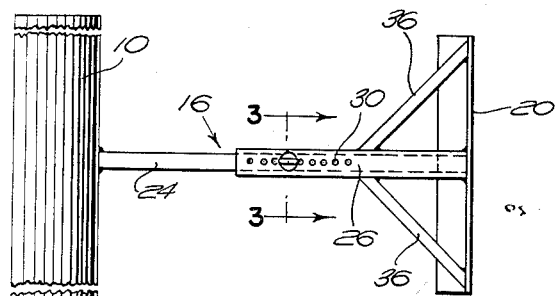
FIGURE 2 is a plan view of the bumper shown in FIG. 1.

To stiffen the bumper, diagonal braces 36 may be secured to extend from at or near the ends of the cross-head so to points on the member 26 as indicated in FIG. 2.

The bumper can easily be picked up and removed to some other place where it may be desired. It can easily be adjusted for use with automobiles having different lengths of forward overhang in front of the forward wheels. When the bumper is in place, the driver of the car drives the car up into actual contact with the plate 10, whereupon the brakes are set.

It is evident that various modifications and changes may be made in the details and structure of the bumper herein before described without departing from the spirit or scope of the invention as defined in the appended claim.

I claim:

A portable stop for an automobile, comprising an elongated plate of a length substantially equal to the track of an automobile, the transverse dimension of which plate is an arc of approximately 50° with a curvature substantially equal to the curvature of an automobile tire, said plate having parallel longitudinal edges one of which is adapted to rest on a supporting surface when the device is in use, an elongated shank rigidly secured at one of its ends to the convex side of said plate at a point midway between the ends of the plate and near the other longitudinal edge thereof, and a cross-head secured to the other end of said shank at right angles thereto and adapted to rest on the supporting surface when the device is in use.

References Cited in the file of this patent

UNITED STATES PATENTS

| 1,276,430 | Smith | Aug. 20, 1918 |
| 1,317,329 | Shorday | Sept. 30, 1919 |
| 1,820,950 | Schulstadt | Sept. 1, 1931 |

FOREIGN PATENTS

| 529,549 | France | Sept. 12, 1921 |